3,305,016
DISPLACEMENT OF OIL FROM PARTIALLY DEPLETED RESERVOIRS

Gordon P. Lindblom, Gerald D. Ortloff, and John T. Patton, Tulsa, Okla., assignors, by mesne assignments, to Esso Production Research Company, Houston, Tex., a corporation of Delaware
No Drawing. Filed Nov. 2, 1959, Ser. No. 850,019
20 Claims. (Cl. 166—9)

The present invention relates to methods for the recovery of petroleum from natural reservoirs and more particularly relates to an improved process for reinstituting or increasing the production of oil from subterranean reservoirs partially depleted by primary recovery techniques. In still greater particularity, the invention relates to an improved secondary recovery process wherein crude oil is displaced from an underground reservoir by flooding the reservoir with an aqueous solution containing a heteropolysaccharide in sufficient quantity to increase the viscosity of the solution.

Recognition that techniques utilized in the initial exploitation of subterranean oil-bearing reservoirs generally permit the recovery of only a small fraction of the total oil originally present in such reservoirs has led to the development of a number of secondary recovery processes designed to stimulate production after the natural energy of the reservoir has been largely expended. The most widely used of these is the waterflooding process. By simply injecting water into an underground reservoir through one or more injection wells under sufficient pressure to force it in the direction of production wells spaced some distance from the injection wells, much of the oil left in the reservoir after the wells have ceased to flow at an economical rate can be recovered. The waterflooding process is considerably more attractive than many other secondary recovery processes of the displacement type because the water utilized can ordinarily be obtained at little cost and need not be recovered from the reservoir in order to make the process economically feasible.

Despite the obvious advantages of waterflooding as a secondary recovery technique, it has often suffered by comparison with other processes. Field evaluations have shown that waterflooding permits the recovery of much oil that cannot be produced by primary recovery techniques but that considerable quantities of oil nevertheless remain in the reservoir following a waterflooding operation. The principal reason for this apears to be the tendency of the injected water to finger through the sections of the reservoir offering the least resistance and to thus bypass much of the oil present in the reservoir. In addition, it has been demonstrated that capillary and surface forces prevent the displacement of appreciable quantities of the oil present in those sections of the reservoir through which the water actually passes.

Fundamental investigations into the mechanisms by which one fluid displaces another within a porous medium have demonstrated that the relative viscosities of the two fluids play an important role in determining the efficiency of the displacement. It can be shown that the displacement efficiency is directly related to the ratio of viscosity of the displacing fluid to that of the displaced fluid. Petroleum normally ranges in viscosity from one or two centipoises up to about 1,000 centipoises or more, depending upon the particular oil reservoir in which it is found. The viscosity of water, on the other hand, is considerably less than one centipoise under the condition prevailing in most subterranean oil-bearing reservoirs. The ratio of the viscosity of water to that of oil is therefore low and hence high displacement efficiencies during secondary recovery processes using water as the displacing agent are not to be expected.

In view of this effect of the viscosity ratio upon displacement efficiency, it has been suggested that a more viscous liquid than water be employed as a displacing agent during secondary recovery operations. Economic considerations dictate that the liquid so used be an aqueous solution. A variety of polymeric materials and other thickening agents have been advocated as useful for preparing such solutions. Tests have demonstrated almost without exception that materials proposed heretofore are not usable, even though they can be employed to form relatively viscous aqueous solutions, because they lack other properties essential to a satisfactory thickener for secondary recovery purposes. For the most part, the materials proposed in the past are relatively expensive and must be used in concentrations which make the cost prohibitive. Moreover, solutions of many such materials tend to plug the pore spaces of the permeable rock which makes up most oil reservoirs and hence would be unsatisfactory even if their use were economically feasible. Other materials proposed heretofore are decomposed, seriously degraded, or precipitated at the temperature prevailing in many subsurface reservoirs and by contact with reservoir sands and connate waters. Still other materials are adsorbed onto the rock surfaces within the reservoirs to such an extent that any increase in viscosity attained is lost almost immediately following injection of solutions of the materials into an injection well.

The present invention provides a new and improved thickening agent for use in preparing viscous waterflooding solutions which is free of the disadvantages which have characterized thickeners suggested in the past. In accordance with the invention, it has now been found that certain heteropolysaccharides formed by the bacterial fermentation of simple carbohydrates possess properties which render them eminently suitable for use as water thickeners in connection with secondary recovery operations. These heteropolysaccharides are much more effective for increasing the viscosity of water than are other polymers and thus can be utilized in concentrations well below those considered to be minimal heretofore.

Solutions of the heteropolymers utilized in accordance with the invention have no perceptible plugging tendencies when used as oil displacing agents in secondary recovery operations. They are exceptionally stable at temperatures considerably above those likely to be encountered in the deepest oil-bearing reservoirs. Neither are they adsorbed by rock surfaces or degraded upon contact with such surfaces. Ionic materials found in most oil-bearing reservoirs have no appreciable effect upon the viscosities of solutions of the polymers. Because of these properties, the heteropolysaccharides are much more attractive than water thickening agents suggested in the past.

Heteropolysaccharides having the characteristics described above are produced by the action of bacteria of the genus Xanthomonas upon a variety of carbohydrate substances, including simple sugars such as glucose and fructose, sucrose, and starch. Representative of these bacteria are *Xanthomonas campestris*, *Xanthomonas phaseoli*, *Xanthomonas malvacearum*, *Xanthomonas*

*carotae, Xanthomonas translucens, Xanthomonas hederae* and *Xanthomonas papavericola*. All of the organisms do not produce the heteropolysaccharides with equal effectiveness and hence certain species of the bacteria are more attractive for synthesizing the heteropolymers than are others. *Xanthomonas campestris* is a particularly effective species.

Methods for effecting production of the heteropolysaccharides are well known to those skilled in the art and have been described in detail in the literature. References include an article by J. G. Leach, V. G. Lilly, H. A. Wilson and M. R. Purvis, Jr., entitled "The Nature and Function of the Exudate Produced by *Xanthomonas phaseoli*," which appeared in Phytopathology, volume 47, pages 113 through 120 (1957); an article by V. G. Lilly, H. A. Wilson and J. G. Leach entitled "Bacterial Polysaccharides II: Laboratory-Scale Production of Polysaccharides by Species of Xanthomonas," which was published in Applied Microbiology, volume 6, pages 105 through 108 (1958); a paper by R. F. Anderson, S. P. Rogovin, M. C. Cadmus and R. W. Jackson, "Polysaccharide Production by *Xanthomonas campestris*," presented at the 136th National Meeting of the American Chemical Society in Atlantic City, New Jersey, on September 14–18, 1959; and a paper by A. R. Jeanes, J. E. Pittsley, J. H. Sloneker and F. R. Senti, "Composition and Properties of a Heteropolysaccharide Produced From Glucose by *Xanthomonas campestris* NRRL B–1459," which was delivered at the 136th National Meeting of the American Chemical Society in Atlantic City, New Jersey, on September 14–18, 1959.

In general, the heteropolymers may be produced by fermenting a medium containing from about 2 percent to about 5 percent by weight of a suitable carbohydrate, organic nitrogen sources, dipotassium hydrogen phosphate and appropriate trace elements with the organism for a period of about three days or longer at essentially room temperature. The incubation is carried out under aerobic conditions. At the end of the incubation period the crude polymer formed may, if desired, be separated from the bacterial cells by centrifugation and may subsequently be isolated and purified by precipitating it with methanol in the presence of an electrolyte.

A typical heteropolysaccharide product is that obtained as a result of the action of *Xanthomonas campestris* NRRL B–1459 upon carbohydrates. This is a polymer containing mannose, glucose, glucuronic acid salts and acetyl radicals in a molar ratio of about 2:1:1:1, respectively. Also present in lesser amounts are about 5.5 weight percent of inorganic materials plus about 0.15 weight percent each of phosphorus and nitrogen. The material in the relatively pure state is a soft, bulky powder slightly tinted by colored materials from the culture medium. It swells rapidly in the presence of small amounts of water, gradually forming a soft gel. The polymer is readily soluble in larger quantities of water. Aqueous solutions containing the heteropolysaccharide in concentrations of 1 percent by weight may typically have viscosities at 25° C. of about 2400 centipoises when tested in the Brookfield viscometer using spindle 3 at 30 revolutions per minute. Brine solutions of the polymer at similar concentrations have similar viscosities. In solution the polymer is insensitive to temperature and ionic materials.

The heteropolysaccharide employed in accordance with the invention as a thickener for waterflooding is generally used in concentrations ranging between about 0.005 percent and about 1.0 percent by weight. Concentrations in the range between about 0.05 percent and about 0.25 percent are preferred. The exact concentration employed will, of course, depend in part upon the characteristics of the reservoir in which the waterflooding operations is to be carried out and upon the properties of the oil present therein. In general it is preferred that sufficient polymer be employed in the flood water to give the water a viscosity of at least 2 centipoises under reservoir temperature conditions. Concentrations sufficient to give viscosities of about 30 centipoises or higher may advantageously be used.

The heteropolysaccharide concentration in the flood water necessary for effective displacement under a given set of conditions may be readily determined by calculating the mobility ratio for the system at hand. The mobility ratio may be considered to be a measure of the volume of displacing fluid which will be required to reduce the oil content of an oil-bearing reservoir to an ultimate equilibrium value. It is defined by the equation $$MR = \frac{V_o K_w}{V_w K_o}$$

where K designates the reservoir permeability, V represents viscosity and the subscripts $w$ and $o$ denote water and oil respectively. A mobility ratio of unity indicates that the water and the oil will move through the reservoir in the presence of one another with equal ease. A given volume of water at a mobility ratio of less than one will displace a markedly greater volume of oil from a reservoir than will the same amount of water at a mobility ratio greater than one. Where practical, the concentration of the heteropolysaccharide in the flood water should be sufficient to give a mobility ratio less than one. Concentrations between about 0.05 percent and about 0.25 percent by weight are generally effective for this purpose.

A further factor governing the concentration of the heteropolysaccharide is the molecular weight, which in turn largely depends upon the nutrient solution employed, the incubation conditions, and the incubation period. It may often be preferred to utilize a relatively low molecular weight material in relatively high concentrations rather than to prepare a high molecular weight polymer which can be used in lesser amounts to achieve the desired viscosity level. In other instances, a high molecular weight heteropolymer could be partially degraded and used in higher concentrations than would otherwise be the case.

In preparing aqueous solutions of the heteropolysaccharide for use in a secondary recovery operation carried out in accordance with the invention, the polymer may be prepared, separated and purified in the manner described above and then added to the water in an amount sufficient to give the desired viscosity. Frequently, however, it will be advantageous to prepare a culture of the organism in sufficient nutrient solution to give the required amount of the heteropolysaccharide and to then add the entire culture to the water. This avoids the necessity for separating and purifying the polymer. Formaldehyde or a similar bactericide may be added to the culture to kill the bacteria before it is added to the flood water.

The heteropolysaccharide may be used to increase the viscosity of all of the flood water employed in the secondary recovery operation. Satisfactory results can generally be obtained, however, by adding the polymer to only the initial portion of the water injected into the reservoir. This leads to the establishment of a bank of viscous solution in the reservoir surrounding the injection well. Ordinary water containing no thickener can then be injected in order to propel the bank of thickened water through the reservoir toward the production wells. The volume of thickened water used in an operation of this type should, of course, be sufficient to prevent the later-injected water from breaking through the bank and contacting the reservoir in advance of the viscous water. A diminishing concentration of the heteropolymer beginning at the leading edge of the bank and continuing to the trailing edge is generally preferable in order to avoid a premature breakthrough of ordinary water when the entire volume of injected water is not thickened. The required thickness of the bank used will obviously depend upon the distance over which it is to be propelled, the nature of the porous rock in the reservoir, and the viscosity of the fluid making up the bank. In an operation carried out with a single injection well and one or more production wells spaced a distance of 600 feet from the injection well, a bank of from 100 to about 400 feet thick should ordinarily be established in the vicinity of the injection well in order to assure that the bank will persist during the entire waterflooding operation. The volume of viscous solution necessary to establish such a bank can readily be calculated from information as to the distance between the injection point to the most remote production well, the average thickness of the reservoir, and the average porosity of the reservoir. Such information is normally available with respect to any reservoir in which a secondary recovery operation is to be carried out. As a general rule, the volume of viscous water used will constitute from 5 to 50 percent of the reservoir pore volume being flooded and will preferably amount to at least 10 percent.

Waterflooding operations are conventionally carried out using certain regular flooding patterns. The flooding pattern utilized may not cover the entire reservoir and hence the volume of the reservoir for purposes of a particular flooding operation is normally considered to be the volume of that portion of the reservoir underlying the lateral area defined by the flood pattern. In a large reservoir, several flood patterns may be carried out simultaneously. In using a bank of thickened water in such a secondary recovery operation, the volume of the reservoir underlying the flood pattern rather than the total reservoir volume should be considered in determining the quantity of thickened water to be used. In line-drive floods for example, it is normally assumed that the pore volume of the reservoir under flood between each line of injection wells and an adjacent row of production wells is the total pore volume of the reservoir underlying the lateral area between the two rows. The quantity of water thickened with the heteropolysaccharide to be injected through a row of injection wells toward an adjacent row of producing wells should then be at least 10 percent of the total reservoir volume underlying the area between the two rows.

The heteropolysaccharides employed as thickening agents in waterflooding operations carried out in accordance with the invention may be used in conjunction with other materials conventionally utilized in waterflooding operations. Such materials include bactericides and preservatives such as formaldehyde and a wide variety of tracers designed to permit a check upon the progress of the flooding operation. Many suitable materials for these purposes will suggest themselves to those skilled in the art. Before such materials are used, care should of course be taken to ascertain that the materials selected do not adversely affect the viscosity of the flood water containing the heteropolysaccharide.

The invention is more fully illustrated by the following examples.

*Example I*

In order to determine the effect of temperature upon the viscosity of aqueous solutions containing the heteropolysaccharide prepared by the action of *Xanthomonas campestris* NRRL B–1459 upon glucose and to compare the performance of the polysaccharide with a similar polymeric material suggested in the past for use as a thickener in waterflooding operations, a 0.1 percent solution of the polysaccharide and a 2 percent solution of dextran in 5 percent sodium chloride solutions were prepared. The initial viscosities of the two solutions were similar. The dextran used in the experiment was a purified polymer obtained from commercial sources and contained 0.4 weight percent of formaldehyde as a preservative. The aqueous solutions thus prepared were placed in separate vessels and heated to their boiling points under identical conditions at atmospheric pressure. Due to the difference in the concentration of the two solutions, the boiling points differed by about 1.0° F. This difference is not significant, since the temperatures used were both well above the temperatures likely to be encountered in an oil-bearing reservoir during secondary recovery operations. The solutions were maintained at their boiling points and their viscosities were measured at periodic intervals. It was found that the viscosity of the dextran solution after 100 minutes was less than half of that of the original solution. The viscosity of the heteropolysaccharide solution, on the other hand, was essentially unchanged when the test was concluded at the end of 1,020 minutes. The results of this test are summarized in the following table.

TABLE I.—EFFECT OF TEMPERATURE UPON THE VISCOSITY OF SOLUTIONS CONTAINING POLYMERIC THICKENERS

| Time, Minutes | Viscosity of Boiled Solutions* | |
|---|---|---|
| | 0.1 Wt. Percent Heteropolysaccharide In 5% NaCl Solution | 2.0 Wt. Percent Dextran In 5% NaCl Solution |
| 0 | 17.0 | 20.0 |
| 5 | 19.0 | |
| 50 | | 14.4 |
| 85 | 24.0 | |
| 100 | | 9.8 |
| 1,020 | 18.0 | |

*Viscosity values were obtained at 80° F. with the Brookfield viscometer at 3 r.p.m. using the U.L. adapter.

The data set forth in the above table clearly demonstrate the marked effectiveness of the heteropolysaccharides as agents for increasing the viscosity of water, show that the polymers may be used in the presence of sodium chloride without adverse results, and point out the exceptional stability of the heteropolysaccharides under elevated temperature conditions. The two solutions prepared and tested had essentially the same initial viscosity despite the fact that the concentration of the heteropolysaccharide was only one-twentieth of that of the dextran. The heteropolysaccharide is manifestly superior to dextran in its thickening power. This is highly significant in view of the fact that dextran is one of the more promising thickening agents suggested for use in waterflooding operations in the past and, considering the cost of the two materials, emphasizes the economies which use of the heteropolysaccharide makes possible.

The fact that solutions of relatively high viscosity were obtained upon addition of the heteropolysaccharide to a five percent brine solution shows that the polymers are not adversely affected by ionic materials. Most connate waters found in petroleum reservoirs are saline and hence polymers which are precipitated by anions or cations are not suitable for use as thickening agents in secondary recovery operations.

The absence of a reduction in the viscosity of the heteropolysaccharide solution over the 17-hour period during which the solution was maintained at the boiling point illustrates the exceptional thermal stability of the polymer. The viscosity of the dextran solution decreased to only half that of the original value in less than two hours. Since the temperatures in petroleum reservoirs generally range between about 85° F. and about 150° F. and since the heteropolysaccharide solution boiled at a temperature of about 213° F., there can be little doubt from the standpoint of thermal stability as to the suitability of the heteropolysaccharide for use as a water thickener in secondary recovery operations.

*Example II*

In a second series of tests, the heteropolysaccharide and three polymers suggested for use as water thickeners in the past were tested to determine whether solutions of the materials were adversely affected by contact with oil reservoir sands. The prior art thickeners tested were (1) a polymethacrylic acid, (2) a polycarboxylic acid, and (3) a dextran similar to that employed in preceding tests. Formaldehyde in a concentration of 0.4 wt. percent was added to the dextran as a preservative. The heteropolysaccharide was similar to that employed in the test of Example I above. The reservoir sand used in the test was taken from the Bachaquero reservoir in Venezuela. Earlier tests carried out with other thickening agents have shown that this reservoir material is particularly apt to affect polymeric thickeners adversely. The tests were carried out by preparing solutions of the four polymers having similar viscosities and then maintaining those solutions in contact with the Bachaquero sand at a temperature of 150° F. for a period of six days. The viscosities of the solutions were measured daily using the Brookfield viscometer and were recorded. The effect of the reservoir material upon the viscosities of the soltuions is shown in Table II below.

TABLE II.—EFFECT OF BACHAQUERO RESERVOIR SAND UPON THE VISCOSITIES OF SOLUTIONS CONTAINING POLYMERIC THICKENERS

| Time, Days | 0.1 Wt. Percent Aqueous Solution of Heteropolysaccharide | 0.2 Wt. Percent Aqueous Solution of Polymethacrylic Acid | 0.5 Wt. Percent Aqueous Solution of Polycarboxylic Acid | 2.0 Wt. Percent Aqueous Solution of Dextran plus 0.4 Wt. Percent HCHO |
|---|---|---|---|---|
| 0 | 17 | 17.1 | 15.0 | 25 |
| 1 |  | 3.0 | 6.2 | 19.8 |
| 3 | 18.4 | 2.1 | 5.0 | 17.2 |
| 5 | 18.2 |  |  |  |
| 6 |  |  | 4.7 | 11.0 |

Again the experimental data demonstrate that the heteropolysaccharides are effective as thickening agents at concentrations much lower than those at which other polymeric materials must be used. It can be seen from the data that the viscosity of the heteropolysaccaride solution was actually slightly higher after five days in contact with the Bachaquero reservoir sand at 150° F. than it was initially. Each of the solutions containing the other polymers showed substantial losses in viscosity after the first day. Moreover, no adsorption of the heteropolysaccharides upon the sand sample was detected. It can thus be seen that the polymeric thickeners employed in accordance with the invention are markedly and surprisingly superior to other polymeric thickening agents.

*Example III*

In order to test the suitability of the heteropolysaccharide for use as a water thickener for secondary recovery purposes still further, a flow test was carried out using a model reservoir. The model was constructed of ¾" internal diameter glass pipe and measured five feet in length. The pipe was packed with +200 mesh clean sand from the Bachaquero reservoir. It had a pore volume of 180 cubic centimeters and a permeability of 12.9 darcys. The model was filled with water containing 50,000 p.p.m. of sodium chloride. An aqueous solution of heteropolysaccharide having a viscosity of 5.92 centistokes at 80° F. was then injected into the model in order to displace the brine. The flow rate was maintained at 18 cubic centimeters per day and the temperature was held at 140° F. The inlet pressure at the model was measured at intervals in order to detect any plugging which might occur. The viscosity of the effluent was measured periodically to determine the effectiveness of the heteropolysaccharide solution as a displacing agent. The results of this test are shown in Table III below.

TABLE III.—FLOW TEST OF HETEROPOLYSACCHARIDE IN BACHAQUERO SAND

| Percent P.V. Produced | Inlet Pressure, p.s.i.g. | Viscosity of Effluent, C.S. |
|---|---|---|
| 50.5 | 0.05 | 1.070 |
| 82.2 | 0.05 | 1.001 |
| 92.9 | 0.05 | 1.106 |
| 97.0 | 0.05 | 2.496 |
| 102.4 | 0.05 | 6.179 |
| 107.5 | 0.05 | 6.019 |

The data in Table III show that the inlet pressure at the model remained constant during the displacement operation and thus indicate that no perceptible plugging of the sand by the polymer occurred. Similar tests using other polymeric thickeners have resulted in increases in the inlet pressure of as much as five pounds per square inch after only a short time. This superiority from the standpoint of plugging constitutes an important advantage for the heteropolysaccharide. The fact that breakthrough of the viscous solution did not occur until between 92.9 and 97.0% of the brine originally present in the model had been displaced demonstrates the remarkable effectiveness of the solution as a displacing agent in waterflooding operations. When other thickeners are tested under the same conditions, breakthrough often occurs after only about 80% of a pore volume of fluids has been produced and hence a much less efficient displacement is obtained.

It will be apparent from the foregoing that the heteropolysaccharides employed in accordance with the invention possess properties which render them suitable for use as water thickeners in secondary recovery operations. These same properties may also make the polymers attractive for use in controlling the flow properties of other aqueous media employed in contact with subterranean formations. Such media include, for example, drilling muds, coring fluids, fracturing fluids and the like.

What is claimed is:

1. In a process wherein an aqueous medium is injected into a subsurface oil-bearing reservoir through an injection well in order to displace crude oil from about said injection well, the improvement which comprises incorporating into said aqueous medium heteropolysaccharide produced by the action of bacteria of the genus Xanthomonas upon a carbohydrate and thereafter injecting said medium into said reservoir.

2. A process for recovering oil from a subterranean reservoir which comprises injecting an aqueous solution of a heteropolysaccharide produced by the action of bacteria of the genus Xanthomonas upon a carbohydrate into said reservoir through at least one injection well and recovering oil displaced by said aqueous solution through at least one production well penetrating said reservoir at a distance from said injection well.

3. A process as defined by claim 2 wherein a solution of a heteropolysaccharide produced by the action of bacteria of the genus Xanthomonas upon a simple sugar is injected into said reservoir.

4. A process as defined by claim 2 wherein a solution of a heteropolysaccharide produced by the action of bacteria of the genus Xanthomonas upon starch is injected into said reservoir.

5. A process as defined by claim 2 wherein said solution contains from about 0.005 to about 1.0 weight percent of said heteropolysaccharide.

6. A process as defined by claim 2 wherein at least 0.10 pore volume of said aqueous solution is injected into said reservoir.

7. A process for increasing the flow of oil from a subterranean reservoir which comprises injecting at least 0.10 pore volume of an aqueous solution containing from about 0.005 to about 1.0 weight percent of a heteropolysaccharide produced by the action of bacteria of the genus Xanthomonas upon a carbohydrate into said reservoir through at least one injection well to establish a bank of said solution around said injection well, thereafter injecting water into said reservoir through said injection well, and recovering oil displaced from said reservoir through at least one production well spaced from said injection well.

8. A process as defined by claim 7 wherein said heteropolysaacharide is that produced by *Xanthomonas campestris*.

9. A process as defined by claim 7 wherein said heteropolysaccharide is that produce by *Xanthomonas phaseoli*.

10. A process as defined by claim 7 wherein said solution contains from about 0.05 to about 0.25 wt. percent of said heteropolysaccharide.

11. A process as defined by claim 7 wherein said solution contains a preservative.

12. A process as defined by claim 7 wherein said solution contains a bactericide.

13. In a process wherein an aqueous medium is injected into a well and circulated in contact with a subsurface formation, the improvement which comprises incorporating into said medium a heteropolysaccharide produced by the action of bacteria of the genus Xanthomonas on a carbohydrate and thereafter injecting said medium into said well.

14. In a process wherein an aqueous medium is injected into a subsurface oil-bearing reservoir through an injection well to displace crude oil toward a production well, the improvement which comprises incorporating into said aqueous medium an acetylated polymer of mannose, glucose and glucuronic acid salts produced by bacterial fermentation of a carbohydrate with organisms of the genus Xanthomonas, and thereafter injecting said medium into said reservoir.

15. A process as defined by claim 14 wherein said polymer contains mannose, glucose, glucuronic acid salts and acetyl radicals in a molar ratio of about 2:1:1:1, respectively.

16. In a process wherein an aqueous medium is injected into a subsurface oil-bearing reservoir through an injection well to displace crude oil toward a production well, the improvement which comprises thickening said aqueous medium with a heteropolysaccharide produced by the action of *Xanthomonas campestris* on glucose and thereafter injecting said medium into said reservoir.

17. In a process wherein an aqueous medium is injected into a sursurface oil-bearing reservoir through an injection well to displace crude oil toward a production well, the improvement which comprises thickening said aqueous medium with a heteropolysaccharide produced by the action of *Xanthomonas campestris* on fructose and thereafter injecting said medium into said reservoir.

18. In a process wherein an aqueous medium is injected into a subsurface oil-bearing reservoir through an injection well to displace crude oil toward a production well, the improvement which comprises thickening said aqueous medium with a heteropolysaccharide produced by the action of *Xanthomonas campestris* on sucrose and thereafter injecting said medium into said reservoir.

19. In a process wherein an aqueous medium is injected into a subsurface reservoir through an injection well to displace crude oil toward a production well, the improvement which comprises thickening said aqueous medium with a heteropolysaccharide produced by the action of *Xanthomonas campestris* on starch and thereafter injecting said medium into said reservoir.

20. A process for recovering oil from a subterranean reservoir which comprises injecting an aqueous solution of a heteropolysaccharide produced by the action of bacteria of the genus Xanthomonas upon sucrose into said reservoir through at least one injection well and recovering oil displaced by said aqueous solution through at least one production well penetrating said reservoir at a distance from said injection well.

References Cited by the Examiner

UNITED STATES PATENTS

| 2,602,082 | 7/1952 | Owen | 252–8.5 |
| 2,660,550 | 11/1953 | Updegraff et al. | 166–45 |
| 2,771,138 | 11/1956 | Beeson | 166–42 |
| 2,868,725 | 1/1959 | Owen | 252–8.5 |

OTHER REFERENCES

CA-N-9, "Information on Polysaccharide B-1495," Department of Agriculture, Agricultural Research Service, Northern Utilization Research and Development Division, Peoria, Ill., September 1959.

CHARLES E. O'CONNELL, *Primary Examiner.*

BENJAMIN BENDETT, *Examiner.*

K. MYERS, W. D. JACKSON, S. J. NOVOSAD,
*Assistant Examiners.*